United States Patent
Li et al.

(10) Patent No.: US 7,713,625 B2
(45) Date of Patent: May 11, 2010

(54) NUCLEATING AGENT COMPRISING A SILICON DIOXIDE CORE AND INJECTION MOLDING METHOD OF POLYETHYLENE TEREPHTHALATE

(75) Inventors: Hsun-Yu Li, Taichung (TW); Chih-Hsiang Lin, Taipei (TW); Chi Lung Wu, Miaoli County (TW); Hsin-Ching Kao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 832 days.

(21) Appl. No.: 11/407,957

(22) Filed: Apr. 21, 2006

(65) Prior Publication Data

US 2007/0152375 A1 Jul. 5, 2007

(30) Foreign Application Priority Data

Dec. 29, 2005 (TW) ............................. 94147220 A

(51) Int. Cl.
*B32B 5/16* (2006.01)
(52) U.S. Cl. .................. 428/403; 428/407; 524/492; 524/493; 524/847; 524/878
(58) Field of Classification Search ................ 428/403, 428/407; 524/492, 493, 847, 878
See application file for complete search history.

(56) References Cited

U.S. PATENT DOCUMENTS

| 4,092,289 | A | * | 5/1978 | Remmington | ............... 523/220 |
|---|---|---|---|---|---|
| 4,272,475 | A | | 6/1981 | Chi | |
| 4,451,606 | A | | 5/1984 | Campbell | |
| 4,522,958 | A | * | 6/1985 | Das et al. | ..................... 523/212 |
| 4,670,203 | A | * | 6/1987 | Chang | ........................ 264/40.6 |
| 4,908,428 | A | * | 3/1990 | Bastioli et al. | .............. 528/272 |
| 5,562,984 | A | * | 10/1996 | Mortlock et al. | ............ 428/364 |
| 6,563,997 | B1 | * | 5/2003 | Wu et al. | ..................... 385/130 |
| 6,761,968 | B2 | * | 7/2004 | Kusume et al. | ............. 428/328 |
| 7,015,267 | B2 | * | 3/2006 | Cartier et al. | ................ 524/404 |
| 2008/0004390 | A1 | * | 1/2008 | Aoshima et al. | ............ 524/430 |
| 2009/0192255 | A1 | * | 7/2009 | Lin et al. | ..................... 524/493 |
| 2009/0270555 | A1 | * | 10/2009 | Satoh et al. | ................. 524/878 |

FOREIGN PATENT DOCUMENTS

| CN | 1687230 A | 10/2005 |
|---|---|---|
| KR | 10-0288684 B1 | 2/2001 |

OTHER PUBLICATIONS

Xin-Ya et. al, "Novel Progress of Application and Surface-modification Technique for Nano-particles Materials," 2005, vol. 10, pp. 58-63.

\* cited by examiner

*Primary Examiner*—H. (Holly) T Le
(74) *Attorney, Agent, or Firm*—Birch, Stewart, Kolasch & Birch, LLP

(57) ABSTRACT

The invention relates to a nucleating agent for polyethylene terephthalate and injection molding method thereof. The nucleating agent comprises a $SiO_2$ core grafted with bis(2-hydroxyethyl)terephthalate, which accelerates the crystallization of polyethylene terephthalate for injection molding.

4 Claims, No Drawings

NUCLEATING AGENT COMPRISING A SILICON DIOXIDE CORE AND INJECTION MOLDING METHOD OF POLYETHYLENE TEREPHTHALATE

BACKGROUND OF THE INVENTION

1. Field of the Invention

The present invention relates to polyethylene terephthalate (PET), and in particular relates to a nucleating agent and an injection molding method for PET.

2. Description of the Related Art

Contemporary material science has many development branch including metals, alloys, ceramics, and polymers. Polymers are most complex thereof because many properties such as viscosity, crystallinity, and melting point are influenced by types of monomers, degree of polymerization, arrangements of the repeating unit, and crosslinking between the polymers. These properties determine the applications and types of molding methods of the polymers. Conventional methods of regulating these properties include altering the monomer to initiator ratio, polymerizing temperature and pressure, and adding nucleating agents to accelerate crystallization of the polymers.

Polyethylene terephthalate (PET) is inexpensive, however; it cannot be used in injection molding because of its slow crystallization rate at high temperatures. On the other hand, PET shaped articles formed at low temperature (60 to 70° C.) are susceptible to degradation. In U.S. Pat. No. 4,272,475, Chi discloses a method for controlling the cylinder temperature, the nozzle temperature, the injection temperature, and the shot time for PET injection articles, but the molecular weight of the articles is too low to be used in engineering-grade plastics. The described problems result from low crystallization rates of high-molecular-weight PET articles at high temperatures. As high molding temperature is required for PET melt to crystallize, an oil bath system is necessary for PET molding. Compared with the water bath system used for polybutylene terephthalate (PBT), the oil bath system for PET is more costly and dangerous.

For increasing the crystallization rate of PET, U.S. Pat. No. 4,451,606 discloses an organic nucleating agent, which is a copolymer of poly(alkylene terephthalate) and a sulfonate salt of an aromatic dicarboxylic acid. This organic nucleating agent can be miscible with PET and cause uniform nucleation. The organic nucleation agent, however, may lose its function at high temperature (about 280-300° C.) due to disproportion or degradation.

To avoid the problems of the organic nucleating agents, inorganic nucleating agents to improve PET crystallization rate have been adopted. As disclosed in U.S. Pat. No. 5,886,088, suitable inorganic nucleating agents include talc, mica, wollastonite, clay, kaolin, diatomaceous earth, bentonite, montmorillonite, hydrotalcite, calcium carbonate, titanium oxide, potassium titanate, asbestos, or barium oxide. The inorganic nucleating agents are less costly, chemically stable, applicable at high temperatures, and of small size to minimize grain radius. The inorganic nucleating agents may improve dimension stability and mechanical strength, but they tend to aggregate at high temperatures due to their large surface area and fewer coordination sites. The described aggregation results in non-uniform nucleation of polymer, thereby deteriorating the properties of PET.

BRIEF SUMMARY OF THE INVENTION

A detailed description is given in the following embodiments with reference to the accompanying drawings.

The invention provides an inorganic/organic oligomer reactive nucleating agent which can be dispersed uniformly in PET by in-situ polymerization without additional fabrication process. The inorganic/organic oligomers reactive nucleating agents overcomes the aggregation of the inorganic nucleating agent, thereby improving crystallization rate and reducing injection-molding cycle time. With the nucleating agent of the invention, PET can substitute the expensive polybutylene terephthalate (PBT) to serve as an injection grade engineering plastic material.

The invention provides a nucleating agent of polyethylene terephthalate, comprising a silicon oxide core, and a plurality of bis(2-hydroxyethyl) terephthalate oligomers grafted on the surface of the silicon oxide core, and the nucleating agent having the formula:

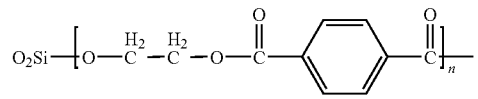

wherein n is an integer larger than 1.

The invention further provides an injection molding method for polyethylene terephthalate, comprising subjecting terephthalic acid, silicon oxide nanoparticles, and ethylene glycol to esterification to form a bis(2-hydroxyethyl) terephthalate monomer and the described nucleating agent; polymerizing the bis(2-hydroxyethyl)terephthalate monomer to form the polyethylene terephthalate, wherein the polyethylene terephthalate and the bis(2-hydroxyethyl)terephthalate oligomers proceed an in-situ polymerization; blending additives with the polyethylene terephthalate by an extruder and processing the blend into pellets; and finally, melting the pellets and injecting the melt into a mold, and cooling the mold to form an article.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides an inorganic/organic oligomer reactive nucleating agent. A nanometer scaled $SiO_2$ (15-25 nm) core is modified by a plurality of bis(2-hydroxyethyl) terephthalate (BHET) oligomers to form the nucleating agent, having the formula as below, with a diameter of about 55-65 nm.

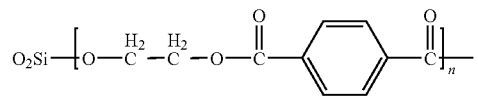

wherein n is an integer larger than 1, preferred from 2-15.

A plurality of BHET oligomers grafted on the $SiO_2$ surface may increase the steric effect and the dispersion degree of the nucleating agent. Because the BHET oligomers are original monomers of PET, no additional procedure is required. The obstacles from an organic nucleating agent, such as disproportion or degradation at high temperature, are overcome by the inorganic/organic oligomer reactive nucleating agent.

The invention further provides an injection molding method of polyethylene terephthalate. First, terephthalic acid, silicon oxide nanoparticles, and ethylene glycol are subjected to esterification to form a bis(2-hydroxyethyl) terephthalate monomer and a described nucleating agent. The bis(2-hydroxyethyl)terephthalate monomer is polymerized to form the polyethylene terephthalate, wherein the polyethylene terephthalate and the bis(2-hydroxyethyl)terephthalate oligomers are polymerized in-situ. Additives are blended with the polyethylene terephthalate by an extruder, and then the blend is processed into pellets. Finally, the pellets are melted, the melt is injected into a mold, and the mold is cooled to form an article. General additives in this field include chain extenders, solid-stating accelerators, impact modifiers, nucleation promoters, anti-hydrolysis additives, reinforcements, flame retardants, or nucleating agents. Because the nucleating agent is grafted to the molecular chain at the beginning, the additives of the invention do not require nucleating agents. Amount of the additives can be changed as necessary. The mold is cooled by a water bath system instead of the conventional oil bath system, thereby reducing cost and factory accidents. The lower cooling temperature means shorter cooling time and shorter injection molding cycle time. The esterification is performed at a temperature of about 150 to 200° C., and the polymerization of polyethylene terephthalate is performed at a temperature of about 250 to 300° C. The described article has a molecular weight of about 15000 to 20000, preferably about 18000. The article has a cold-crystallization peak temperature above 200° C., and semi-crystallizes in less than 1 minute at a temperature below 190° C. During polymerization of the bis(2-hydroxyethyl)terephthalate monomer process, the BHET oligomers of the nucleating agent and the PET are polymerized in-situ, such that the nanometer scaled $SiO_2$ is uniformly dispersed into the PET. The BHET oligomers grow longer making the BHET chain hard to break at high temperatures, and the larger steric effect of the longer oligomers may improve the degree of dispersion.

Alternatively, the PET raw material is formed first, the inorganic/organic oligomer reactive nucleating agent and the additives is blended with the PET raw material by an extruder, and the blend is processed into pellets. After the described process, the pellets are melted, and the melt is injected into a mold.

Conventionally, the PET is melted at 280-300° C., and the nucleating agent is then added for forming pellets by mechanical force. This kind of PET tends to thermally degrade or degrade due to thermal-oxidation at high temperature processes. On the other hand, the inorganic nucleating agents are susceptible to aggregate. The invention provides a nucleating agent which in-situ polymerizes with the monomers, thereby preventing the obstacles from the conventional nucleating agents and procedures.

Compared to the expansive PBT, the less costly PET with added nucleating agent of the invention has similar crystallization properties. The modified PET of the invention can be applied in engineering-grade plastic, such as electronic components or motor vehicle parts. The $SiO_2$ of the nucleating agent enhances wear-resistance and mechanical properties of the PET, such that the PET can substitute conventional nylon fiber, such as fishing lines, fishing nets, tires, drapes, or other nylon production.

EXAMPLES AND COMPARATIVE EXAMPLES

Example 1

Ethylene glycol (63 g, 1 mol), $SiO_2$ (1.2 g, 19.9 mol), and p-phthalic acid (166 g, 1 mol) were charged in a reactor under $N_2$ at a back pressure of 3 kg/cm$^2$, and then heated to 180-200° C. for distilled water. The described esterification was completed in about 2.5 hours. A nucleating agent of a diameter of about 59.8 nm was formed after polymerization at 280° C. and back pressure less than 60 mmHg. Thermal analysis shows that the nucleating agent cannot be decomposed over 300° C., which means the nucleating agent has great thermal stability. The described reaction formula is:

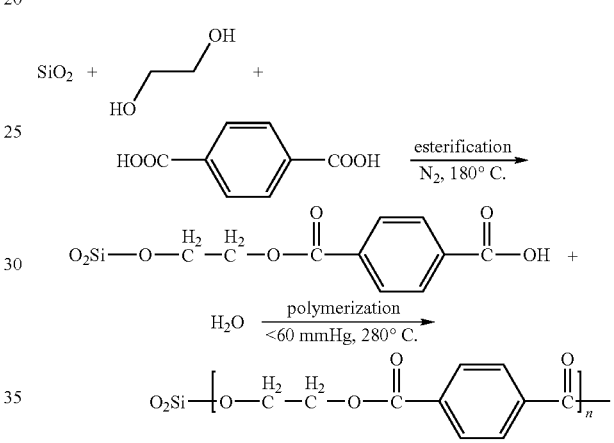

Example 2

BHET oligomers (50 g, 0.2 mol) and $SiO_2$ (5 g, 0.08 mol) were charged in a reaction apparatus, and heated about 1.5 hours (the heating time depends on the polymerization degree of the BHET oligomers). A nucleating agent similar to Example 1 was formed by polymerization at 280° C. and back pressure less than 60 mmHg. The described reaction formula is:

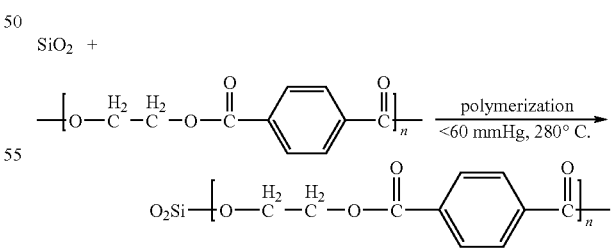

Example 3

Ethylene glycol (63 g, 1 mol), various amounts of $SiO_2$, and p-phthalic acid (166 g, 1 mol) were charged together for polymerization to form the modified PET. Properties of the PET, the PBT, and the modified PET are shown in Table 1.

TABLE 1

|  | PBT | PET | PET/nucleating agent | PET/nucleating agent | PET/nucleating agent | PET/nucleating agent |
|---|---|---|---|---|---|---|
| SiO$_2$ (wt %) | 0 | 0 | 0.25 | 0.5 | 1 | 3 |
| Tg (° C.) | 45 | 76.9 | 74.4 | 76.5 | 77.7 | 76.1 |
| Tm (° C.) | 220 | 249.2 | 250.1 | 254.3 | 253.1 | 259.3 |
| Tcc (° C.) | 174.8 | 167.3 | 182.5 | 205 | 182.0 | 180.6 |
| crystallinity (%) | 8.5 | 1.6 | 2.3 | 8.5 | 4.3 | 5.9 |

Accordingly, the modified PET of the invention is similar to the PBT. All modified PET properties are better than PET without nucleating agent, such as glass transition temperature (Tg), melting point (Tm), cold-crystallization temperatures (Tcc), and crystallity. Compared to the PET without nucleating agent, the PET added with 0.5 wt % of nucleating agent reduces the semi-crystallization time from 2.55 minutes to 0.87 minutes. The shorter semi-crystallization time makes modified PET similar to PBT, but the raw material cost of the PET is much less than PBT.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A nucleating agent of polyethylene terephthalate, comprising:
   a silicon oxide core, and
   a plurality of bis(2-hydroxyethyl) terephthalate oligomers grafted on the surface of the silicon oxide core, and the nucleating agent having the formula:

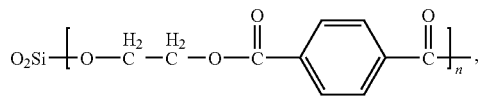

wherein n is an integer larger than 1.

2. The nucleating agent as claimed in claim 1, wherein n is from 2 to 15.

3. The nucleating agent as claimed in claim 1, wherein the silicon oxide core has a diameter from about 15 to 25 nanometers.

4. The nucleating agent as claimed in claim 1, wherein the nucleating agent has a diameter from 55 to 65 nanometers.

* * * * *